Oct. 27, 1931.  J. J. KUREK  1,829,487
BRAKE
Filed Sept. 27, 1928
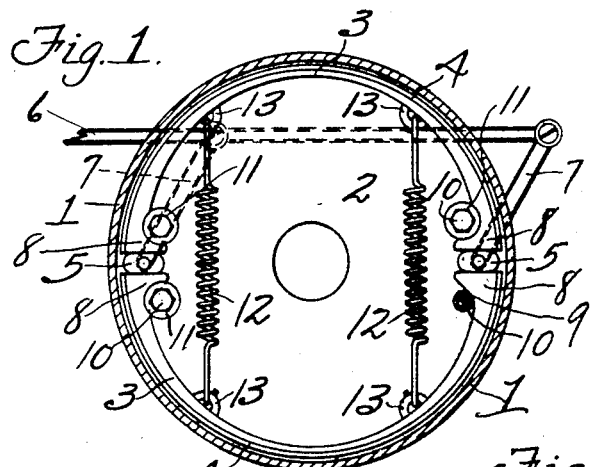
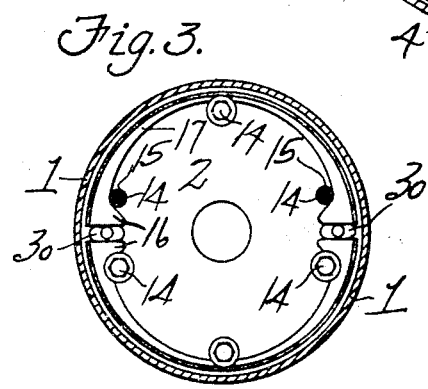
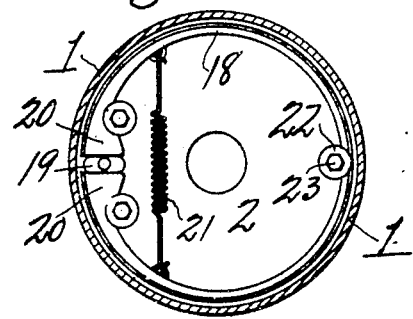
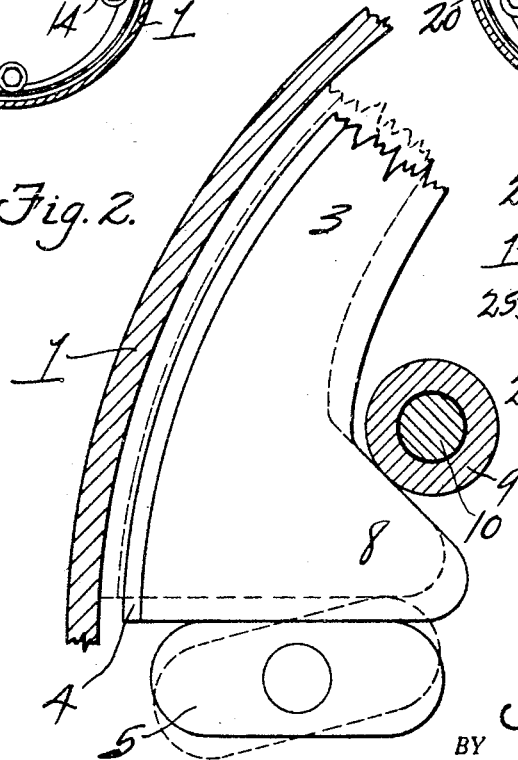
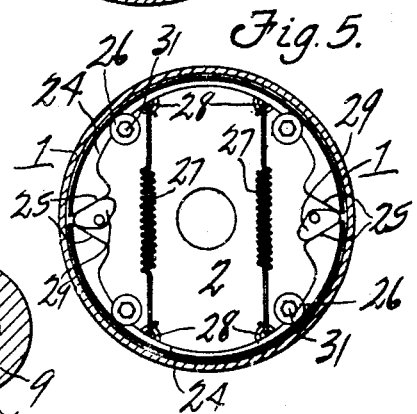
INVENTOR.
John J. Kurek.
BY
ATTORNEY.

Patented Oct. 27, 1931

1,829,487

UNITED STATES PATENT OFFICE

JOHN J. KUREK, OF SOUTH BEND, INDIANA; FRANK WISNIEWSKI ADMINISTRATOR OF SAID JOHN J. KUREK, DECEASED

BRAKE

Application filed September 27, 1928. Serial No. 308,860.

The invention relates to wheel brakes, and more particularly to internal expanding friction brakes in which the opposite ends are moved in opposite directions to effect the braking action.

One object of the invention is to provide a device of this character in which all of the friction surface of the expansible flexible friction device is brought into bearing contact with the brake drum at the same time and with the same pressure, whereby the brake lining of the friction device will apply equally and wear equally throughout its length.

A further object is to provide a device of this character which will operate in the same manner and with the same efficiency in either direction of rotation of the brake drum.

A further object is to provide a device of this character which is so constructed and has such a mode of operation that adjustment of the parts is never required after the device has once been properly assembled.

A further object is to provide a device of this character in which the number of parts has been reduced to a minimum, so that the cost of materials, manufacture and assembly is substantially reduced, while at the same time providing a brake of high efficiency.

With the above and other objects in view, the invention resides in the combination and arrangement of parts as hereinafter set forth, shown in the drawings, described and claimed, it being understood that changes in the precise embodiment of the invention may be made within the scope of what is claimed without departing from the spirit of the invention.

In the drawings:

Figure 1 is a vertical sectional view through the brake drum showing the brake shoes and the operating parts in side elevation.

Figure 2 is a fragmentary view of the brake showing the principle of operation thereof.

Figures 3, 4 and 5 show modified embodiments of the invention, each view being in vertical section and showing the brake shoes and the operating parts of the brake in side elevation.

Referring to the drawings, the numeral 1 designates a brake drum of the conventional construction which is carried by the wheel, and 2 designates a face plate, which is also of conventional construction and which is carried by some stationary part or the axle of the vehicle. These parts being common to all of the constructions shown have the same reference letters in each figure.

The preferred construction of the device is shown in Figure 1, in which two symmetrical, oppositely disposed, flexible brake shoes 3, carrying the brake lining 4, are disposed in the brake drum in spaced relation to each other and to the brake drum. Disposed between the adjacent ends of the brake shoes 3 are the cam members 5, which are rotatably mounted on stub shafts journaled in the face plate 2, and which are connected to the actuating rod 6 by means of the levers 7 secured at one end to said stub shafts, so that each cam will be actuated to the same extent and degree as the other. At each end of the brake shoes 3 is formed an inwardly extending cuneal head 8, the end faces of said heads being in alignment with respect to each other, and the opposing end faces of the brake shoes being parallel to each other. Rollers 9 mounted on the bolts 10 carried by the face plate are engaged by the inner inclined faces of the heads 8. The washers 11, which are also mounted on the bolts 10, hold the brake shoes against lateral movement. The retractile springs 12 connecting the oppositely disposed brake shoes are attached at their ends to the apertured members 13, which are preferably integrally formed with the brake shoes.

In the operation of the brake the cams 5 are equally rotated, and the brake shoes are spread apart, each shoe being moved an equal distance. In forcing the brake shoes apart the angular inner faces of the heads 8, which bear against the roller members 9, cause the brake shoe ends to be forced obliquely outwardly by the rollers. The angular faces of the heads 8, which have an angle of approximately 45 degrees to the direction of movement of the shoes, cause the ends of the brake shoes to be moved laterally outwardly the same distance as the shoes are moved bodily to effect contact with the drum, since there is the same clearance between the brake shoes and the brake drum at all points. It will thus be seen that the brake shoes will be flexed and moved outwardly in a manner so that all points thereof will be brought into conformity with the curvature of the brake drum, whereby equal initial contact and pressure will be applied by the brake shoes against the brake drum. With this construction an equal wear of the brake lining results, since no one part thereof comes prematurely into contact with the drum, or bears upon the drum to aid in the flexing of the remainder of the shoe to make it conform with the curvature of the drum. As a result of the uniform wear on all parts of the brake lining, the brake never needs adjustment after it has once been properly assembled, because all of the friction producing parts wear equally, and the operative parts never need have their position with relation to each other or the brake drum changed in order to function properly. The springs 12 provide positively acting means insuring the return of the brake shoes to release position upon release of the brake actuating means.

In the modification of this brake which is shown in Figure 3, several slight changes have been made which simplify the brake but do not alter the principle of operation thereof. The springs 12 shown in Figure 1 are eliminated, the inherent retractive spring action of the brake shoe 17 itself when flexed being relied upon to bring the shoe back into normal release position. In the expanded position, the angular faces of the cuneal heads 16 at the ends of the shoes bear against the rollers 15 mounted on the bolts 14, and when the operating cams 30 are released, the brake shoe ends tend to draw inwardly causing the inclined faces to slide along the rollers 15, thus drawing the shoes as a whole away from the drum. It will be seen that the cams 30 limit the return movement of the shoes and insure correct positioning thereof.

In the modification shown in Figure 4, the same principle of operation is also employed, but only one brake shoe 18 is used which extends substantially the entire circumference of the drum. Also only one operating cam 19 is needed. The heads 20 at the ends of the brake shoes have a different inclination than those shown in the other constructions. The angle of inclination of these heads will be approximately 70 degrees from the horizontal because the brake shoe must be moved substantially radially through almost 360 degrees in this construction, rather than through only about 180 degrees, as in the constructions using two brake shoes. It will also be noted that in this construction one spring 21 is preferably used to obtain a positive release action of the brake shoe. A washer 22 mounted on the bolt 23 opposite the center of the brake shoe prevents the center of the brake shoe from moving laterally at that point.

In the modification shown in Figure 5 the principle of flexing and moving the brake shoes to initially bring the shoes throughout their length into contact with the drum is also employed. The principle of angular faces of the shoe heads acting against rollers is not used, the rollers being dispensed with, but the same results are obtained in substantially the same manner in so far as the salient feature of the invention is concerned. In this construction the ends of the brake shoes 24 are oppositely inclined, as at 25. Washers 26 carried by the bolts 31 serve to prevent lateral movement of the shoe. Retractile springs 27, connected at their ends to the brake shoes, force the shoes to release position. The actuating cams are rotatably mounted in the same manner as those in the other constructions but are of irregular shape. The bearing faces of the cams 29 are arcuate and of comparatively large radius to prevent binding, and opposite bearing points must be the same distance from the axis of rotation of the cam to prevent unequal actuation of the brake shoes. The principle of the operation of this brake is that force applied to the ends of the brake shoes by the cams will be applied perpendicularly to the inclined faces of the ends of the shoes, so that the ends of the shoes will be moved angularly outwardly simultaneously and in equal degree with the movement of the shoes as a whole, whereby to change the normal curvature of the brake shoes so as to conform to the curvature of the brake drum at the time of engagement therewith, and thereby obtain, as in the other modified structures herein shown and described, a complete initial contact between the shoes and the drum.

From the foregoing it will be seen that a brake is provided which initially in applying the brake utilizes the entire outer friction surface of flexible brake shoes; which provides uniform wear on the brake lining; which eliminates the necessity of adjustment; which is equally efficient in both directions of rotation of the drum; and which, because of the small number of parts used is exceedingly simple in construction.

The invention having been set forth, what is claimed as new and useful is:

1. In a brake, a brake drum, spaced flexible brake shoes extending substantially the entire circumference of the drum within the drum, a cuneal head formed at each end of said shoes, a brake actuating members disposed between the ends of said brake shoes, a face plate, and roller members carried by said face plate against which one face of each cuneal head bears.

2. In a brake, a brake drum, spaced flexible brake shoes extending substantially the entire circumference of the drum, said brake shoes being circumferentially disposed within the drum, a cuneal head formed at each end of said shoes, brake shoe actuating members disposed between the ends of said brake shoes and forming means for forcing said ends apart, a face plate, roller members carried by said face plate against which one face of each head bears for forcing said brake ends outwardly as they are forced apart, and means for retracting said brake shoes.

3. In a brake, a brake drum, spaced symmetrical brake shoes spaced from said drum, said brake shoes having ends adjacent each other and at opposite sides of the drum, a face plate, brake shoe actuating means between the brake shoe ends and cooperating with both of said ends for forcing the same apart, means for retracting said brake shoes, and anti friction members carried by said face plate, said brake shoes having cuneal heads inwardly extending at each end thereof and bearing against said anti friction members, said cuneal heads and anti friction members forming means whereby the ends of the brake shoes are flexed outwardly when said ends are forced apart.

4. In a brake, a brake drum, a face plate, a flexible friction device, ends carried by said flexible friction device, means cooperating with said ends for actuating said device carried by said face plate, abutments carried by said face plate, said friction device having inwardly directed angular faces at the ends thereof adapted to slidably bear against said abutments for flexing the friction device as it is moved by the actuating means.

5. In a brake, a brake drum, a face plate, spaced flexible symmetrical brake shoes spaced from said brake drum, ends of said shoes terminating adjacent each other, brake actuating means carried by said face plate and disposed between the ends of said brake shoes and cooperating with said ends for forcing the ends apart, retracting springs extending between said brake shoes, and abutments carried by said face plate adjacent the ends of said brake shoes, the adjacent ends of said brake shoes having inwardly converging angular faces adapted to slidably bear against said abutments and be forced outwardly by said abutments.

6. A brake comprising a drum, concentrically arranged brake shoes within the drum, the ends of said brake shoes terminating adjacent each other, actuating cams between the ends of the brake shoes and forming means whereby when rotated said brake shoes will be forced apart and cam means cooperating with said brake shoe ends for forcing the same outwardly and flexing the shoes as the shoe ends are forced apart.

7. The combination with brake shoes, adjacent ends carried by said shoes, means between the brake shoe ends for forcing said ends apart, said brake shoes being flexible, of means cooperating with said shoe ends whereby when the shoe ends are forced apart said shoe ends will be simultaneously forced outwardly and the shoes flexed to greater diameters.

In testimony whereof I affix my signature.

JOHN J. KUREK.